Feb. 7, 1956
C. O. BROWN ET AL
2,733,885
THERMOMETER HOLDER
Filed July 18, 1952
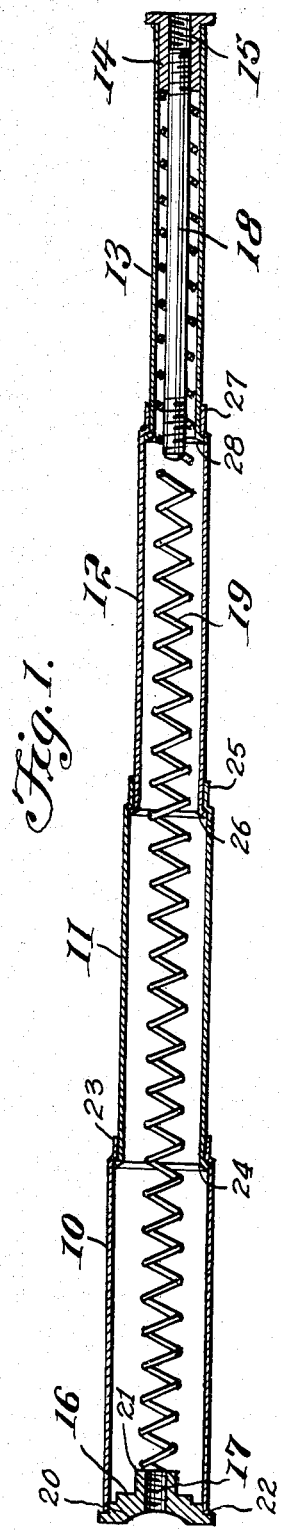
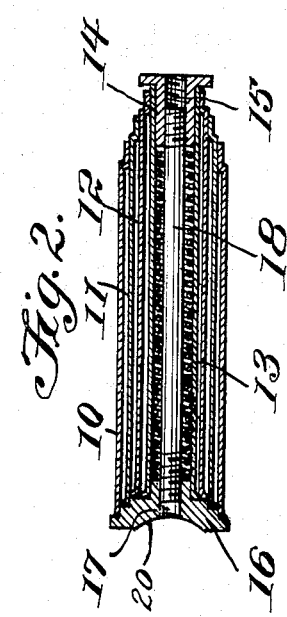
INVENTOR.
Charles O. Brown
Edith M. Brown
BY Victor J. Evans & Co.
ATTORNEYS United States Patent Office 2,733,885
Patented Feb. 7, 1956

2,733,885
THERMOMETER HOLDER
Charles Otis Brown and Edith M. Brown, Fresno, Calif.
Application July 18, 1952, Serial No. 299,696
1 Claim. (Cl. 248—161)

This invention relates to a thermometer and a holder therefor, in which the holder comprises a telescoping tube with a spring therein and the tube and thermometer are positioned in a compartment of a refrigerator with the tube holding the thermometer against one side of the compartment whereby a bulb of the thermometer is in direct contact with the wall.

This application is a continuation in part of our prior Patent No. 2,605,987.

The object of the invention is to provide a holder for supporting a thermometer against a heat-exchanging surface, such as a refrigerator, in order to position the thermometer for quick and accurate temperature measurements.

Another object of the invention is to provide a refrigerator thermometer holder adjustable as to length which comprises a plurality of sections telescopically adjustable whereby the holder can be adjusted to firmly engage supporting abutments to retain the holder in position.

A further object of the invention is to provide a refrigerator thermometer holder which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a longitudinal sectional view showing the thermometer holder wherein a spring extends continuously throughout the length of the holder.

Figure 2 is a view showing the holder in a collapsed position.

Referring now to the drawings wherein like reference characters denote corresponding parts, the thermometer holder of this invention includes a plurality of telescopic sections 10, 11, 12 and 13 with a plug 14 having a threaded bore 15 in the outer end of the section 13 and with a disc 16 having a threaded bore 17 in the extended end of the section 10, whereby the ends of a bolt 18 may be threaded into the plug and disc for retaining the sections collapsed, as shown in Figure 2, against the tension of a spring 19 which urges the holder to an extended position.

The end surface of the disc 16 is provided with an arcuate recess 20 extended transversely thereof adapted to be positioned against the cylindrical surface of a thermometer of the tubular type with the thermometer positioned against the inner surface of a wall of a refrigerator. The inner surface of the disc 16 is provided with a hub 21 over which the end of the spring 19 is positioned. The inner surface of the disc 16 is also provided with a plurality of stepped annular shoulders positioned to receive the ends of the telescopic sections with the device in the collapsed position as shown in Figure 2.

The end of the tubular section 10 is secured, such as by brazing or welding, in an annular recess 22 of the disc 16 and the opposite end of the section 10 is crimped inwardly providing an annular flange 23 that coacts with a rim 24 of the section 11 to retain the parts in assembled relation. The section 11 is provided with a similar annular flange 25 that coacts with a rim 26 of the section 12 and the section 12 is provided with an annular flange 27 that coacts with a rim 28 on the inner end of the section 13. The extended end of the section 13 is secured to the plug 14 by brazing or the like.

With the parts assembled in this manner, the holder is adapted to be collapsed for storage and shipping and the parts may be released and extended for frictionally holding a tubular thermometer against the inner surface of a wall of a refrigerator with the extended end of the plug 14 bearing against the wall at the opposite side of the refrigerator.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

In a holder adapted for use in retaining a tubular thermometer against the inner surface of a wall of a refrigerator, the combination which comprises a tubular section having a disc with a threaded bore providing a closure in one end with the end surface of the disc having an arcuate recess extended transversely thereof and with the opposite face of the disc provided with stepped annular shoulders, the opposite end of said tubular section having an annular flange extended therefrom, the inside diameter of said annular flange being less than the inside diameter of the tubular section, an intermediate tubular section the outside diameter of which corresponds with the inside diameter of the annular flange of the former tubular section whereby the intermediate tubular section is adapted to slide in said flange, the end of the intermediate tubular section extended into the former tubular section having a rim thereon preventing accidental separation of the sections, said intermediate tubular section also having an annular flange extended from one end and the diameter of the annular flange of the intermediate tubular section being less than the inside diameter of said intermediate tubular section, a small tubular end section, the outside diameter of which corresponds to the inside diameter of the flange extended from the intermediate tubular section whereby the small end section is adapted to slide through said flange, the end of said small end section having a rim for preventing accidental separation of said section from the intermediate tubular section, a plug having a threaded bore secured in the extended end of said small end section, a bolt having threaded ends threaded into the bore of said plug and adapted to be threaded into the disc at the end of the large tubular section for retaining said sections in collapsed relation with adjacent ends of the tubular sections positioned on the shoulders of the disc, and a spring extended continuously through said tubular sections for urging the sections to extended positions.

References Cited in the file of this patent
UNITED STATES PATENTS

| | | |
|---|---|---|
| 969,851 | Eickershof | Sept. 13, 1910 |
| 1,548,053 | Mead | Aug. 4, 1925 |
| 1,639,551 | Booth | Aug. 16, 1927 |
| 1,999,844 | McElroy | Apr. 30, 1935 |
| 2,608,420 | Eck | Aug. 26, 1952 |